US008289200B2

(12) United States Patent
Batten et al.

(10) Patent No.: US 8,289,200 B2
(45) Date of Patent: Oct. 16, 2012

(54) MOBILE ELECTRONIC DETECTION DEVICE WITH USER SELECTABLE ALERTS

(75) Inventors: Michael Batten, Westminster, MA (US); Craig R Autio, Orange, MA (US)

(73) Assignee: The Whistler Group, Inc., Bentonville, AR (US)

( * ) Notice: Subject to any disclaimer, the term of this patent is extended or adjusted under 35 U.S.C. 154(b) by 0 days.

(21) Appl. No.: 13/151,111

(22) Filed: Jun. 1, 2011

(65) Prior Publication Data

US 2011/0234442 A1 Sep. 29, 2011

Related U.S. Application Data

(62) Division of application No. 12/407,674, filed on Mar. 19, 2009.

(51) Int. Cl.
*G01S 7/42* (2006.01)
*G01C 3/08* (2006.01)

(52) U.S. Cl. .......................................... 342/20; 342/180

(58) Field of Classification Search ..................... 342/20
See application file for complete search history.

(56) References Cited

U.S. PATENT DOCUMENTS 3,060,427 A * 10/1962 Jaffe et al. ..................... 342/428
5,668,554 A * 9/1997 Orr et al. ......................... 342/20
5,900,832 A * 5/1999 Valentine et al. ............... 342/20
5,990,821 A * 11/1999 Sakar .............................. 342/54
6,169,511 B1 * 1/2001 Iwakuni et al. ................. 342/20
6,297,732 B2 * 10/2001 Hsu et al. ...................... 340/439
6,549,145 B2 * 4/2003 Hsu et al. ...................... 340/905
6,583,750 B2 * 6/2003 Shin ............................... 342/20
6,639,542 B2 * 10/2003 Autio et al. ..................... 342/20
6,756,884 B1 * 6/2004 Dijkstra ..................... 340/425.5
7,023,374 B2 * 4/2006 Jossef et al. ................... 342/20
7,126,567 B2 * 10/2006 Nishikawa ...................... 345/77
7,136,482 B2 * 11/2006 Wille ....................... 379/373.02
7,215,276 B2 5/2007 Batten et al.
7,362,239 B2 * 4/2008 Franczyk et al. ............ 340/936
7,504,983 B2 * 3/2009 Chen et al. ...................... 342/20
7,566,142 B2 * 7/2009 Wesson ......................... 362/231
2006/0125616 A1 * 6/2006 Song ............................ 340/463

OTHER PUBLICATIONS

"Escort 9500i Passport Owner's Manual". Escort Inc. 2007. 18 pages.*

The Veil Guy. "Whistler XTR-695 Radar Detector Review". Jun. 27, 2008. pp. 1-7. Accessed Sep. 27, 2011. <http://web.archive.org/web/20080728020825/http://www.laserveil.com/whistler/xtr-695/>.*

* cited by examiner

*Primary Examiner* — John B Sotomayor
*Assistant Examiner* — Matthew M Barker
(74) *Attorney, Agent, or Firm* — David W. Carstens; Kevin M. Klughart; Carstens & Cahoon, LLP

(57) ABSTRACT

A detection device for detecting the presence of a speed detection system, red light camera, or other electronic surveillance means. The device includes a display means whereby the graphical and audible presentation changes from the non alert condition to the alert condition in accordance to a user selectable choice of options, thereby increasing awareness to the surveillance threat.

11 Claims, 4 Drawing Sheets

PIN CONNECTIONS

GREEN ①o—▷|—o④ GREEN

RED ②o—▷|—o⑤ RED

BLUE ③o—▷|—o⑥ BLUE

① ② ③ ANODE

④ ⑤ ⑥ CATHODE

MOBILE ELECTRONIC DETECTION DEVICE WITH USER SELECTABLE ALERTS

CROSS-REFERENCE TO RELATED APPLICATIONS

This application is a divisional of co-pending U.S. patent application Ser. No. 12/407,674 filed Mar. 19, 2009.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates to a vehicle mounted traffic surveillance system detection device, and, more specifically, to a device that mounts on the dashboard or windshield of an automobile for detection of microwave and/or laser energy emitted from police speed detection and speed camera apparatuses as well as location of red light cameras.

2. Description of Related Art Including Information Disclosed Under 37 CFR 1.97 and 1.98

Existing radar/laser detectors and red light/speed camera location detectors are typically mounted to the dashboard or windshield of a motor vehicle. These detectors serve to alert the motor vehicle operator to the detection of microwave and/or light energy emitted by police radar and laser guns used for traffic speed enforcement, or to alert the operator as the vehicle approaches a known red light or speed camera location.

Typical radar/laser detectors typically contain a microwave horn, RF circuitry, a microprocessor, a display (such as text, LED, or 7 Segment), and an audible alerting device (such as a speaker, buzzer, or piezo element). Typical red light/speed camera detectors may also utilize a GPS engine, microprocessor, display (such as text, LED, or 7 Segment), and an audible alerting device. Some products have combined all these elements into a single housing. Control of these devices, separate or combined, is accessible by the user through front or top mounted switches. These devices are usually powered by a cigarette lighter adapter and cord that is configured to engage with a power jack receptacle located on the product housing.

In the beginning, police speed radar was only on X band and a simple detection diode circuit and horn were necessary to detect the electromagnetic energy. This method of detector was completely passive and did not emit electromagnetic radiation. The method of alerting was a simple illumination device of a single color and an audio alert.

As K band was introduced; early detector manufacturers modified their units to receive the new frequency in addition to the X band. As X band door openers became popular, it became necessary to differentiate the detected bands in such a way that the user would be able to readily distinguish between a possible X band door opener detection event and a K band law enforcement detection event. The typical methods of identifying and alerting a user to detection of the different bands was to provide a different colored illumination indicator, a different audio tone or pattern, or both. Such differentiation assisted the operator with the threat level assessment.

In the 1980s, Ka band was added to the arsenal of law enforcement tools. Initially, these radar guns were offered at select, single, frequencies in the 34 GHz region. In the early 1990s, additional guns became available in the 34.0-35.0 GHz region, and in the mid 1990s, new guns covered the entire Ka band region of 33.4-36.0 GHz. In the late 1980s, the first Laser gun for speed measurement enforcement was introduced. With the proliferation of these various enforcement tools, it became necessary to provide further distinguishing visual and audible alerts to the vehicle operator. Additional single colored LEDs were added to the product to provide this distinction as well as unique audible tones or patterns.

Each existing product manufacturer selected a color to represent the individual bands. In some cases, the same colors were used by different manufacturers but the location of the illuminating device on the product provided the distinction. In other cases, two different colored illuminating devices provided this distinction. For example, a first LED would illuminate for the detection of X band, a second LED for K band, and both the first and second LEDs for Ka band. In addition, different pad printing on the product's display window provided clarification as to the band identification. Additional LEDs were often added to the product to provide a separate, distinct, display for Laser detection. While this method worked relatively well for each individual brand or model, it was confusing when consumers changed brands or models and the colors or patterns were not the same as the previous brand or model. This caused consumers to re-familiarize themselves with color and band identification association.

Having the ability to customize the color of the alert for each band would be highly beneficial to a detector operator. However, existing devices do not provide this capability. For example, it would be beneficial if an operator could configure a device to display specific colors that they can see if their eyesight suffers from color blindness. It would also be beneficial if an operator could select colors such as green, yellow, and red typically associated with levels of urgency similar to traffic lights. They may also choose to set up alert colors similar to another brand or model that they have been accustomed to eliminate the need to retrain their brain when the unit alerts. Additionally, the user could scroll or alternate between two or more colors to provide a more urgent, visual affect.

As K band became a popular choice for door openers in the 1990s, it became more important to focus the alert information towards Ka band. Because the new radar speed frequencies were introduced in stages a few years apart, there were many varieties of detectors with many variations of the 1st local oscillator (L.O.) frequency plans and various sweep rates. The abundance of the swept frequency plans and rates created another problem. Many of these radar receivers unintentionally emit a 1st L.O. at a variety of frequencies and patterns, creating a "signature" when detected by another detector. This signature can often replicate the characteristics of speed radar guns. This is commonly referred as police radar detector, or PRD "falsing." Many of these "false" signals occur in the Ka band. Because Ka band is 2600 MHz wide, some detector manufacturers have incorporated what is known as "Spec" mode or "Tech" mode to provide the frequency information of the detected signal on the text display.

This was an effort to inform the operator of the frequency in use for the area in which they travel. However, it was ultimately left up to the operator to try and figure out if the information was "close enough" to the known police radar gun frequencies to be a concern. The problem with the information provided in this manner is that the average detector operator might not know what the valid Ka frequencies are.

Having the ability to assist in distinguishing valid police radar threats from PRD falsing would be highly beneficial to a detector operator. However, existing detectors do not possess this capability. While some of the Spec and Tech modes offer frequency information such as "33.712 GHz," "35.566 GHz," or "34.820 GHz," it is still up to the user to determine if the frequency displayed is "close enough" (within tolerance) of a specific radar gun before determining if the alert is caused by a PRD. This human processing requires significant time, knowledge and experience to assess such a threat.

A detection unit that could automatically perform the analysis and provide the nominal information of the radar gun would be highly beneficial to a detector operator. However, existing detectors do not possess this capability. For example, if a radar gun with a nominal frequency of 34.7 GHz and a tolerance of +/−100 MHz were to be detected, simply displaying 34.7 for any signal in this 200 MHz window would benefit the user as they would now be educated as to the nominal radar frequency and would not have to determine if 34.635 GHz is "close enough". Furthermore, as there are three primary Ka frequencies in use in the USA and two additional Ka frequencies in use worldwide, if an allowance is made for their tolerances, the window would cover approximately 1000 MHz of the 2600 MHz wide band. This would allow the remaining 1600 MHz to not provide a frequency indication. Thus, there is a high potential that the alert in these areas is not within the tolerance of any current Ka radar guns on the market.

Another option that is not present in existing detectors would be to categorize the frequency information in blocks of 100 MHz with the rounding of the tolerance above and below each relative frequency that would result in a display ending in XX.X50 GHz. If this were so, an operator would need to remember three frequencies for each radar gun. For example, 34.630 and 34.766 is within the tolerance of a 34.7 GHz radar gun, but because one frequency is below 34.650 and the other frequency is above 34.750, one would be displayed as 34.6 Ghz and the other would be displayed at 34.8 GHz. The opportunity to not display frequencies that are not within tolerance of the current Ka radar guns could still exist such as displaying only "Ka BAND" in place of frequencies that represent the areas outside the tolerances of current Ka police radar guns such as 33.4, 33.5, 34.5, 34.9, 35.0, 35.1, 35.2, 35.3, 35.7, 35.8, 36.9, and 36.0 GHz.

Laser was introduced to police law enforcement tools in the late 1980s. Consequently, the ability to detect laser energy was added to radar detectors creating yet another need for additional display indicators: lights and/or tones. The two earlier brands of Laser guns operated at a wavelength of 904 nm, but utilized different pulse rates (PPS, pulses per second) as their pulse train. One gun was just above 120 PPS and the other at 900 PPS. It became necessary for Laser detectors to alert to both of the pulse rates as well as potential new laser guns, which might operate above, below, or in between the currently, then known pulse rates. As laser detectors were also subject to alerting from stationary, non police, laser sources within these PPS rate windows, it was accepted that these sources cause laser alerts and users were careful when driving in these specific locations in the event that police laser was also in use and masking the risk. Common display alerts to laser range from a single LED, a backlit icon, to the word "LASER" on a text display. One manufacturer actually displays the potential gun on the text display based on the PPS rate. Naming the Laser gun can cause confusion as today there are many brands/models that may be the same or similar rates, making the information inaccurate other than to alert you to a form of laser being targeting on your detector.

With the introduction of Adaptive Cruise Control, which utilizes laser signals to dynamically assist with the braking operation of a vehicle, laser alerts can be generated from non-stationary sources, resulting in an annoying level of laser alert "falsing". Having the ability to know the PPS rate would provide a significant advantage as it would allow the user to determine if the PPS rate is close enough to a known gun. If the user can determine if the PPS rate was related to a laser adaptive cruise control signal, the user could store this specific rate and treat the alert differently or even eliminate the PPS rate from alerting to future encounters. However, existing detectors do not possess this capability.

FIG. 1A depicts a typical prior art LED display radar detector (11), consisting of an antenna (10), buttons (12), and a display portion (13). FIG. 1B shows the display portion (13), which depicts individual LED (14) as an example of an alert indicator. FIG. 1C shows a typical leaded light emitting diode, LED which can provide more than one color. As discussed previously, such detectors provide very limited indications, such as yellow or red, when different frequencies are detected.

FIG. 2A depicts a typical prior art radar detector utilizing an LCD text display. The displaying portion (20) includes a character display (21) comprising of a backlit background (22). FIG. 2C is a typical LCD text display comprising a printed circuit board (33), a display module (35) and backlighting LEDs (34). FIG. 2D provides details of a typical surface mount, multicolored, LED. Such detectors are an improvement in that more colors are available for distinguishing the various detected frequencies. However, these detectors are usually limited to allowing the user to customize the overall color of the display to match the vehicle's interior.

FIG. 3A depicts a typical detector utilizing an icon display portion (50). The icon display portion is shown in FIG. 3B and consists of an LED array (60), covered by an overlay label (62), which has characters cut out from the overlay, providing an icon which is backlit by the LED. FIG. 3C shows the display assembly (70), consisting of an LED array (72), an overlay label (74), and a color (76), associated with the LED backlighting device. The different icons are displayed depending on the type of signal detected. However, the icons are fixed and provide essentially no customizability.

BRIEF SUMMARY OF THE INVENTION

It is one object of the present invention to provide the ability to customize the color of the alert for each type of signal detected. It is yet another object of the present invention to assist the operator in distinguishing valid police radar threats from PRD falsing. It is yet another object of the present invention to automatically perform the analysis and provide the nominal information of the radar gun. It is yet another object of the present invention to assist the operator in determining if the PPS rate of a laser signal is close enough to a known laser gun for the detection event to be valid.

The present invention satisfies these objects by providing a detector device for detecting the presence of a speed detection or traffic surveillance system. The device comprises detection circuitry, a display device, an alerting device, and a means for allowing an operator to provide selections for device operational characteristics. For example, the operator may configure the device to respond with a certain alarm or indication when a particular detection event occurs.

The display device can utilize multi-colored LEDs. Through the operator selection device it is possible to configure the device to respond with a first color to an X band detection event, a second color to a K band detection event, a third color to a Ka band detection event, and a fourth color to a laser detection event. Likewise, an LCD may have a multi-colored backlight that serves the same purpose. The device may also be configured to scroll through the colors for any of the detection events. With an LCD display it is also possible for the device to directly report the detected radar frequency or the detected laser pulse rate.

Onboard memory allows configuration, operator setting, or detection events to be stored and recalled as needed. The device can ignore laser energy emitted from Adaptive Cruise Control systems by saving the detected laser energy pulse rate. Upon the next laser detection event the system can recall the previous pulse rate, compare it with the detected pulse rate, and make a determination as to whether or not the detection event merits an alarm.

These and other improvements will become apparent when the following detailed disclosure is read in light of the supplied drawings. This summary is not intended to limit the scope of the invention to any particular described embodiment or feature. It is merely intended to briefly describe some of the key features to allow a reader to quickly ascertain the subject matter of this disclosure. The scope of the invention is defined solely by the claims when read in light of the detailed disclosure.

BRIEF DESCRIPTION OF THE SEVERAL VIEWS OF THE DRAWING(S)

The present invention will be more fully understood by reference to the following detailed description of the preferred embodiments of the present invention when read in conjunction with the accompanying drawings, wherein.

Figure 1A:
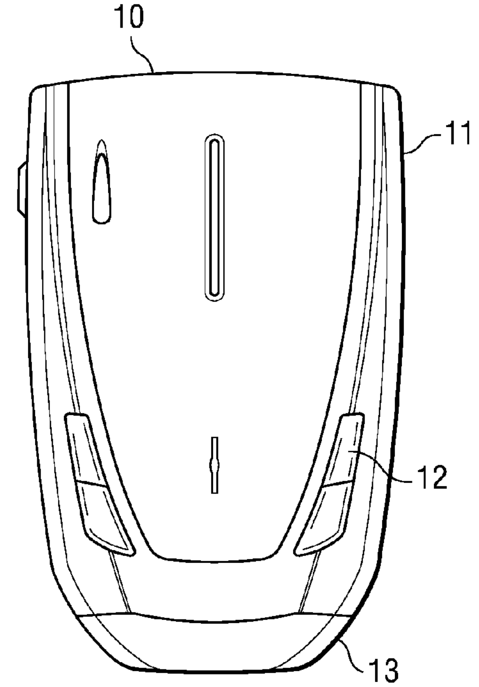
FIG. 1A (PRIOR ART)
FIG. 1A depicts the top view of a typical detector with an LED display.
Figure 1B:
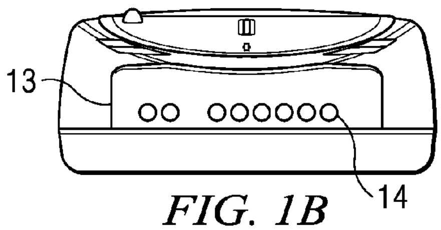
FIG. 1B (PRIOR ART)
FIG. 1B depicts the front view of a typical detector with an LED display.
Figure 1C:
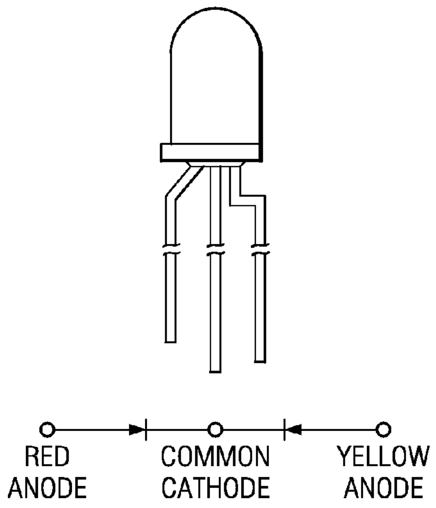
FIG. 1C (PRIOR ART)
FIG. 1C depicts a typical LED used with an LED display.
Figure 2A:
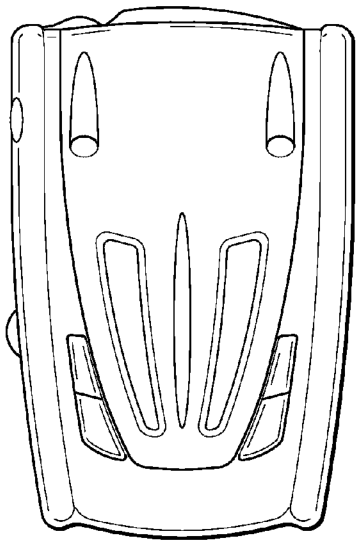
FIG. 2A (PRIOR ART)
FIG. 2A depicts a top view of a typical detector with a text display.
Figure 2B:
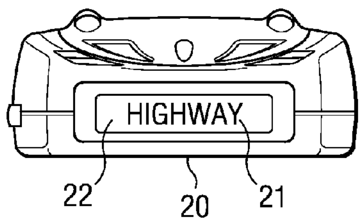
FIG. 2B (PRIOR ART)
FIG. 2B depicts a front view of a typical detector with a text display.
Figure 2C:
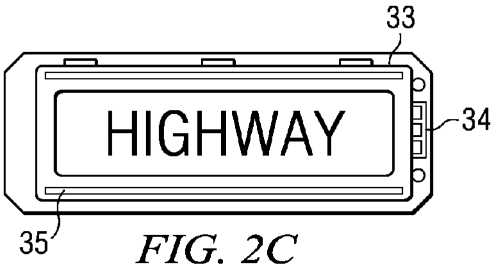
FIG. 2C (PRIOR ART)
FIG. 2C depicts a typical, backlight, Liquid Crystal Display (LCD)
Figure 2D:
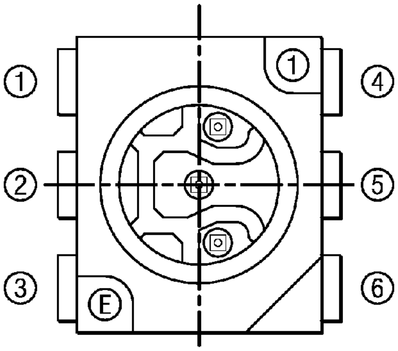
FIG. 2D (PRIOR ART)
FIG. 2D depicts a typical, surface mount, multi-colored, LED.
Figure 3A:
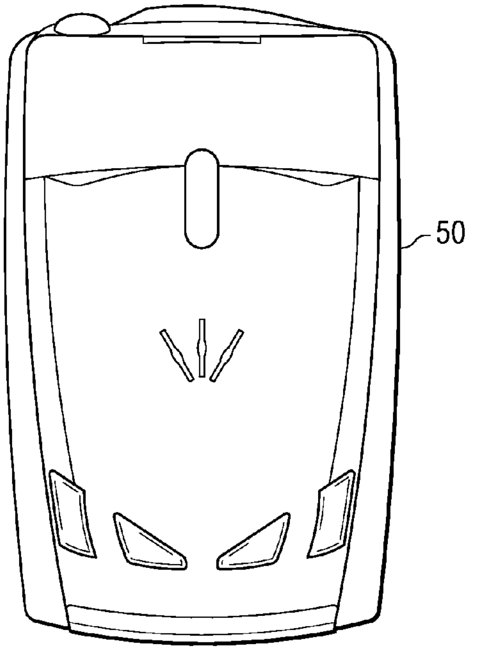
FIG. 3A (PRIOR ART)
FIG. 3A depicts a top view of a typical detector with an LED, Icon, display.
Figure 3B:
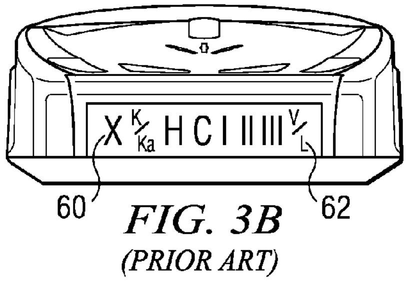
FIG. 3B (PRIOR ART)
FIG. 3B depicts a front view of a typical detector with an LED, Icon, display.
Figure 3C:
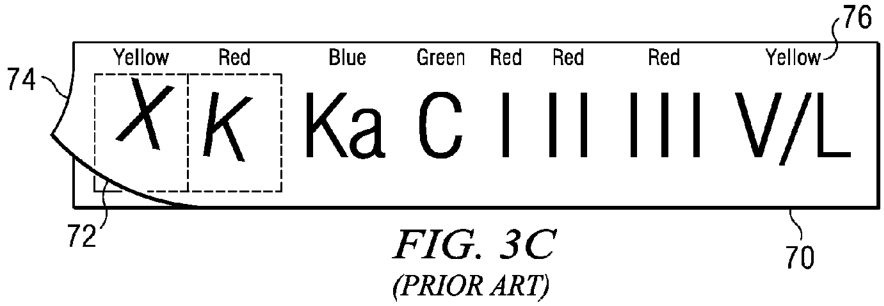
FIG. 3C (PRIOR ART)
FIG. 3C depicts a typical LED, Icon, display.

The above figures are provided for the purpose of illustration and description only, and are not intended to define the limits of the disclosed invention. Use of the same reference number in multiple figures is intended to designate the same or similar parts. Furthermore, when the terms "top," "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the particular embodiment. The extension of the figures with respect to number, position, relationship, and dimensions of the parts to form the preferred embodiment will be explained or will be within the skill of the art after the following teachings of the present invention have been read and understood.

DETAILED DESCRIPTION OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Figure 4:
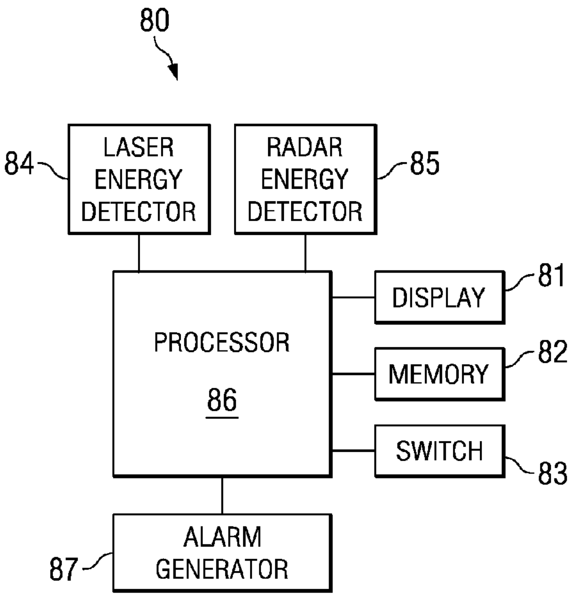
FIG. 4 depicts flow diagram of the major functions of an embodiment of a detector utilizing the present invention.

FIG. 4 depicts a block diagram of the electronic assembly of the preferred detector device. While there are many known electronic assemblies that would be adequate for this application, a device as described in U.S. Pat. No. 7,215,276, the disclosure of which is expressly incorporated herein by reference, will suffice. The detector device detection circuitry in this embodiment is a combination laser/radar detector (80) comprising a laser detector circuit (84) and a radar detector circuit (85). Laser detector (84) and radar detector (85) are each coupled to a microcontroller (86). The microcontroller (86) receives signals from each of the laser and radar detectors (84 and 85) and in response the microcontroller (86) provides control signals to the laser and radar detectors and to a display device (81). In another embodiment, the detection circuitry may consist only of the radar detector (85) and microcontroller (86). System memory (82) is also provided to allow the system to store set points, configuration details, and/or detection event details.

In this embodiment, the electronic assembly also includes an alarm generator (87) responsive to the detection circuitry output (86). The alarm generator (87) causes the alerting device to sound an audible alarm. For example, the alerting device may be a speaker, buzzer, or piezo element. One skilled in the art will appreciate that any device for generating an audible tone may serve as an alerting device (87).

The Display device (81) may include, for example, a display screen comprised of light emitting diodes (LEDs). Alternatively or in addition thereto, the display device (81) may comprise a liquid crystal display (LCD), a vacuum fluorescent (VF) display, or an LED segment display and corresponding driver circuitry. Those of ordinary skill in the art will recognize, of course, that other types of visual displays may also be used and are within the scope of the present invention.

The electronic assembly of the present embodiment also comprises one or more operator selection devices for configuring the device. Through the operator selection device, the system can also accept input from the operator with regards to a detection event that the operator wishes the system to ignore or to treat differently. Examples of operator selection devices include, but are not limited to, one or more switches (83), pushbuttons, thumbwheels, touch-screens, or the like.

In one embodiment, the LED display is comprised of multi-colored LEDs. This may include use of multiple, single colored LEDs of different colors or single LEDs capable of emitting light of different color wavelengths. The different colors serve as distinct visual characteristics of the display device. By utilizing such LEDs, the detector device can be configured to display a different color in response to different detection events. For example, the operator may configure the detector using the selection device (83) to cause the display (81) LED to glow in a first color for K band detection events, a second color for X band detection events, a third color for Ka band detection events, and a fourth color for laser detection events. Further, the operator may configure the device to “scroll” through the colors for a given event. For example, the device may “scroll” by sequencing through the available colors for a laser detection event.

In another embodiment the LCD display utilizes a multi-colored backlight. This allows the backlight to glow in different colors for different events. For example, the operator may configure the detector using the selection device (83) to cause the display (81) LCD backlight to glow in a first color for K band detection events, a second color for X band detection events, a third color for Ka band detection events, and a fourth color for laser detection events. Further, the operator may configure the device to “scroll” through the colors for a given event. For example, the device may “scroll” by sequencing through the available colors for a laser detection event. In yet another embodiment, the device may report the radar frequency or laser pulse rate to the operator as a numeric value or textual representation.

It should be noted that the microprocessor (86) is here shown as a single microcontroller coupled to both the laser and radar detectors (84 and 85). However, in an alternate embodiment of detector system (80) a pair of microcontrollers may be provided with a first one of the pair being coupled to a first one of the laser and radar detectors (84 and 85) and a second one of the pair of microcontrollers being connected to a second one of the laser and radar detectors (84 and 85). The choice between using a single microcontroller or a pair of microcontrollers may be made according to a variety of factors including but not limited to the cost of manufacturing the detector system (80) having one microcontroller compared with the cost of manufacturing the detector system (80) having a plurality of separate microcontrollers.

The laser detection circuitry (84) coupled with the microprocessor (86) allows measurement of the pulse rate of the detected laser energy. In one embodiment, the display device displays this numerical pulse rate to the operator during a detection event. If a particular detection event indicates that the laser energy is from a known gun, the display may indicate as such. If, however, the laser energy is not from a known gun, the system can allow the operator to lock-out this pulse rate and prevent an alarm from being generated, or provide an alternate alert. For example, the laser used in Adaptive Cruise Control can trigger a laser energy detection event. If this laser pulse rate differs significantly from known law enforcement laser guns, the system can remember this Adaptive Cruise Control laser energy detection event by saving the pulse rate measurement in system memory. When another Adaptive Cruise Control laser energy detection event occurs, the device may then compare the new detection event with previous detection events and prevent the system from reporting the laser detection event to the operator or it may provide an alternate alert.

Figure 5:
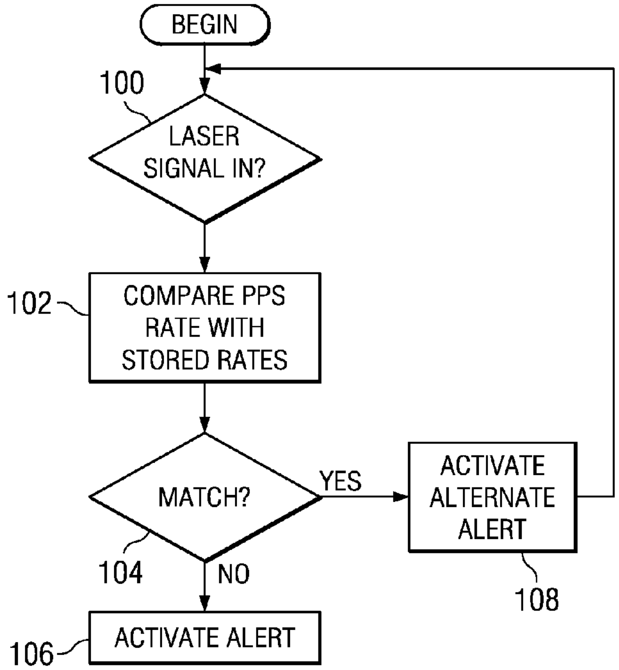
FIG. 5 depicts a flow diagram of the laser detection circuitry of an embodiment of a detector utilizing the present invention.

FIG. 5 depicts a flow diagram of the logic behind this type of laser energy detection analysis. As depicted, a laser signal is first detected (100). The microprocessor then compares this detected laser pulse rate (pulses per second, or PPS) with previous laser detection events (102) stored in the onboard memory. It is then determined if a match is found (104). If the detection events match, the system may activate an alternate type of alert (108)—such as, but not limited to, not alerting the operator at all or reporting to the operator that a previously stored laser PPS has been detected. How the event is treated is determined by operator input. If the detection events do not match, then the laser event is likely a law enforcement laser gun and the system directly alerts the operator (106). By providing the ability to “remember” the pulse rate of various Adaptive Cruise Control laser energy detection event the system can effectively “lock-out” the detected laser pulse rate.

The present embodiment also allows determination of the nominal frequency of a detected law enforcement radar gun or traffic surveillance system. When a radar gun or traffic surveillance system detection event occurs, the system analyzes and determines the frequency of the signal it detects. Law enforcement radar guns operate on known frequencies and have known frequency tolerances. Thus, when a radar detection event occurs, the present embodiment can compare the detection event with known assigned radar gun frequencies. If the detection event is within the tolerance of a known radar gun frequency, then the system alerts and reports to the operator that a valid radar gun is near. To assist the operator in mentally processing the report, the system displays the assigned frequency of the radar gun as opposed to the exact detected frequency. If the detected frequency is outside of the known gun tolerance, then the system merely displays the band of the frequency detected. For example, “Ka” is shown the user if the frequency is in the Ka band and is not within the tolerance of a known radar gun. In another embodiment, the system displays assigned characters associated with the assigned frequency of the radar gun as opposed to the exact detected frequency. For example, if a 33.8 GHz radar gun is detected, the unit may display “BEE III” instead of the assigned 33.8 GHz nominal frequency.

In another embodiment the detector device includes a global positioning system (GPS) module that allows the detector to determine its location. The GPS device may be an integral component of the detector, or it may be peripheral with a connection to the detector’s processor (86). With a GPS module it is possible for the system to serve as a “location advisor” with respect to red light cameras. For example, because red light cameras are stationary surveillance systems it is possible to map the location of each with latitude/longitude coordinates. These coordinates may be stored in the detector device onboard memory for later recall. As a vehicle mounted detector moves within close proximity to a known red light camera location (based on stored coordinates), the detector may provide a visible and/or audible notification to the operator. The notification can be provided by a color change or color “scroll” of the display (configured previously by the user), or it may be a textual indication of the event (such as “RLC” or the like).

The foregoing detailed description of the present invention is provided for the purposes of illustration only, and is not intended to be exhaustive or to limit the invention to the precise embodiments disclosed. Accordingly, the scope of the present invention is defined by the following claims.

The invention may be embodied in other specific forms without departing from the spirit or essential characteristics thereof. The present embodiments are therefore to be considered in all respects as illustrative and not restrictive. Accordingly, the scope of the invention is established by the appended claims rather than by the foregoing description. All changes which come within the meaning and range of equivalency of the claims are therefore intended to be embraced therein. Further, the recitation of method steps does not denote a particular sequence for execution of the steps. Such method steps may therefore be performed in a sequence other than that recited unless the particular claim expressly states otherwise.

We claim:

1. A detector device for alerting an operator to the presence of a speed detection or traffic surveillance system, the detector device comprising:

a housing comprising:

detection circuitry responsive to microwave energy, wherein detection of a predetermined microwave frequency causes a detection event that is unique to the detected microwave frequency;

a display device responsive to the detection circuitry output; and an alerting device responsive to the detection circuitry output, wherein the display device is configured to scroll through two or more operator selected colors in response to the detection event that are different than a color that is visible when no event is detected.

2. The detector device of claim 1, the detector device further comprising:

detection circuitry responsive to laser energy, wherein detection of a laser pulse rate causes a detection event that is unique to the detected laser pulse rate.

3. The detector device of claim 1, wherein the detection circuitry detects at least one frequency characteristic of the speed detection or traffic surveillance system, the detector device further comprising:

a storage device for storing the at least one frequency characteristic related to a detection event, wherein the present detection event is compared with a past detection event, and wherein the operator may configure the detector to disable the display device or the alerting device, or provide an alternate display or alert, if the present detection event frequency characteristic is substantially the same as a stored detection event frequency characteristic.

4. The detector device of claim 1 or claim 2, the detector device further comprising:

a storage device for storing one or more operator selections.

5. The detector device of claim 1 or claim 2, wherein the display device comprises at least one multi-colored LED.

6. The detector device of claim 5, wherein the display device sequences through all available LED colors in response to a specific detection event.

7. The detector device of claim 1 or claim 2, wherein the display device comprises at least one LCD having multi-colored backlighting.

8. The detector device of claim 7, wherein the display device sequences through all available backlighting colors in response to a specific detection event.

9. The detector device of claim 2, wherein the display device comprises at least one LCD display, and wherein the detection circuitry is capable of providing a numerical indicator of the pulse rate of the detected laser pulse frequency, the detector device further comprising:

a microcontroller configured to cause the pulse rate of the detected laser signal to be displayed in a numerical format on the LCD display.

10. The detector device of claim 9, the detector device further comprising:

a storage device for storing one or more laser pulse rates.

11. The detector device of claim 2, wherein the detection circuitry detects the pulse rate of the speed detection or traffic surveillance system, the detector device further comprising:

a storage device for storing the laser pulse rate obtained during a detection event, wherein the present detection event is compared with a past detection event, and wherein the operator may configure the detector to disable the display device or the alerting device, or provide an alternate display or alert, if the present detection event pulse rate is substantially the same as a stored laser pulse rate.

* * * * *